(12) United States Patent
Omura

(10) Patent No.: US 11,784,365 B2
(45) Date of Patent: Oct. 10, 2023

(54) BATTERY MODULE

(71) Applicant: Panasonic Intellectual Property Management Co., Ltd., Osaka (JP)

(72) Inventor: Tetsuji Omura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 68 days.

(21) Appl. No.: 16/487,868

(22) PCT Filed: Feb. 13, 2018

(86) PCT No.: PCT/JP2018/004772
§ 371 (c)(1),
(2) Date: Aug. 22, 2019

(87) PCT Pub. No.: WO2018/159275
PCT Pub. Date: Sep. 7, 2018

(65) Prior Publication Data
US 2020/0251699 A1    Aug. 6, 2020

(30) Foreign Application Priority Data
Mar. 1, 2017   (JP) ................................. 2017-038118

(51) Int. Cl.
*H01M 2/10* (2006.01)
*H01M 10/6551* (2014.01)
(Continued)

(52) U.S. Cl.
CPC ... *H01M 10/6551* (2015.04); *H01M 10/0481* (2013.01); *H01M 50/209* (2021.01);
(Continued)

(58) Field of Classification Search
None
See application file for complete search history.

(56) References Cited

U.S. PATENT DOCUMENTS

2013/0183571 A1* 7/2013 Miyazaki ............ H01M 10/647
429/156
2017/0352850 A1 12/2017 Nagane et al.
(Continued)

FOREIGN PATENT DOCUMENTS

| JP | 2016-048634 | 4/2016 |
| WO | 2016/084272 | 6/2016 |
| WO | 2016/174855 | 11/2016 |

OTHER PUBLICATIONS

International Search Report of PCT application No. PCT/JP2018/004772 dated Mar. 20, 2018.

*Primary Examiner* — Zhongqing Wei
(74) *Attorney, Agent, or Firm* — McDermott Will & Emery LLP

(57) ABSTRACT

A battery module includes: a battery stack that includes a plurality of batteries stacked; a pair of end plates that are disposed at both ends, in stack direction X in which the batteries are stacked, of the battery stack, the pair of end plates including at least one end plate that includes a first portion made of a first metal that has a Young's modulus higher than a Young's modulus of a second metal, and a second portion made of the second metal that has a density lower than a density of the first metal; a restraint member that is made of the first metal and sandwiches the battery stack and the pair of end plates in stack direction X; and a welded portion that connects the first portion of the at least one end plate with the restraint member.

19 Claims, 7 Drawing Sheets

(51) Int. Cl.
  *H01M 10/04*   (2006.01)
  *H01M 50/24*   (2021.01)
  *H01M 50/209*   (2021.01)
  *H01M 50/224*   (2021.01)
  *H01M 50/231*   (2021.01)
  *H01M 50/264*   (2021.01)
  *H01M 50/236*   (2021.01)
  *H01M 50/242*   (2021.01)
  *H01M 50/273*   (2021.01)
  *H01M 50/291*   (2021.01)
  *H01M 50/293*   (2021.01)

(52) U.S. Cl.
  CPC ....... *H01M 50/224* (2021.01); *H01M 50/231* (2021.01); *H01M 50/236* (2021.01); *H01M 50/24* (2021.01); *H01M 50/242* (2021.01); *H01M 50/264* (2021.01); *H01M 50/273* (2021.01); *H01M 50/291* (2021.01); *H01M 50/293* (2021.01); *H01M 2220/20* (2013.01); *Y02E 60/10* (2013.01)

(56) References Cited

U.S. PATENT DOCUMENTS

| | | |
|---|---|---|
| 2018/0138559 A1 | 5/2018 | Omura |
| 2018/0212212 A1* | 7/2018 | Cao ..................... H01M 50/256 |

* cited by examiner

BATTERY MODULE

CROSS-REFERENCE TO RELATED APPLICATIONS

This application is a U.S. national stage application of the PCT International Application No. PCT/JP2018/004772 filed on Feb. 13, 2018, which claims the benefit of foreign priority of Japanese patent application 2017-038118 filed on Mar. 1, 2017, respectively, the contents all of which are incorporated herein by reference.

TECHNICAL FIELD

The present invention relates to a battery module.

BACKGROUND ART

Some power sources, such as power sources for vehicles, need to output high voltage. As such a power source, a battery module that includes a plurality of batteries connected in series is known. PTL 1 discloses a power storage device that includes end members disposed at both ends of a battery stack, and a frame that sandwiches the battery stack and the end members. The end members are fixed to the frame by welding. The end members are also referred to as end plates. The frame is also referred to as a fastening member.

CITATION LIST

Patent Literature

PTL 1: Unexamined Japanese Patent Publication No. 2016-48634

SUMMARY OF THE INVENTION

In recent years, battery modules need to output further high voltage. To satisfy this necessity, the number of stacked batteries in a battery module tends to increase. However, the increase in the number of batteries increases dimensional variation in a whole battery module. The dimensional variation is caused by swollen batteries. Therefore, rigidity of the battery module is wanted to be increased. The increase in rigidity of the battery module increases dimensions and a weight of the battery module. However, the increase in dimensions and a weight of the battery module is wanted to be avoided as much as possible. If a battery module includes welded structure in which end plates are welded to a fastening member, materials of the end plates and the fastening member are restricted. Therefore, it is difficult to increase rigidity of the battery module without increase in size and weight of the battery module.

The present invention is made considering the above situation. It is an object of the present invention to provide a technique that increases rigidity of a battery module and restricts increase in size and weight of the battery module.

An aspect of the present invention is a battery module. A battery module includes: a battery stack that includes a plurality of batteries stacked; a pair of end plates that are disposed at both ends, in a stack direction in which the batteries are stacked, of the battery stack, the pair of end plates including at least one end plate that includes a first portion made of a first metal that has a Young's modulus higher than a Young's modulus of a second metal, and a second portion made of the second metal that has a density lower than a density of the first metal; a restraint member that is made of the first metal and sandwiches the battery stack and the pair of end plates in the stack direction; and a welded portion that connects the first portion of the at least one end plate with the restraint member.

According to the present invention, rigidity of a battery module is increased while increase in size and weight of the battery module is restricted.

DESCRIPTION OF EMBODIMENTS

Figure 1:
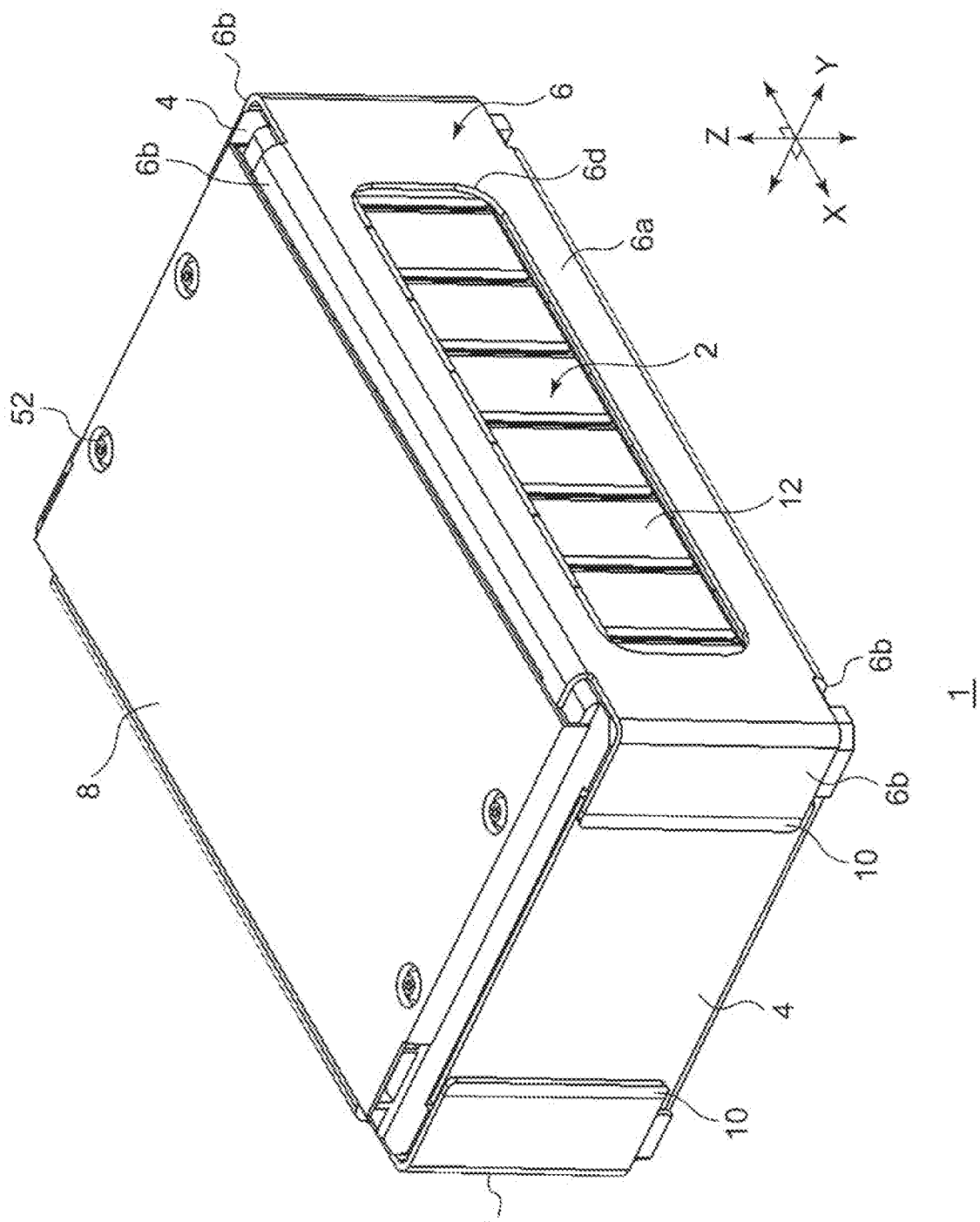
FIG. 1 is a schematic perspective view that illustrates a structure of a battery module according to a first exemplary embodiment.

Hereinafter, the present invention will be described based on preferred exemplary embodiments with reference to the drawings. The exemplary embodiments are exemplifications and do not limit the invention. All features described in the exemplary embodiments and combinations of all the features are not necessarily essential to the invention. The same reference marks are assigned to the same or equivalent components, members, and processes illustrated in the drawings. Explanation for the same or equivalent components, members, and processes will not be repeated as appropriate. For convenience, scales or shapes of portions illustrated in the drawings are determined to facilitate explanation of the portions. The scales or shapes of portions should not be interpreted as limitation unless otherwise mentioned. Even the same members in different drawings may slightly differ from each other in scale or the like. Further, the terms "first", "second", and the like used in the present description and claims do not mean any order or importance, but are intended to distinguish between one configuration and another configuration.

First Exemplary Embodiment

Figure 2:
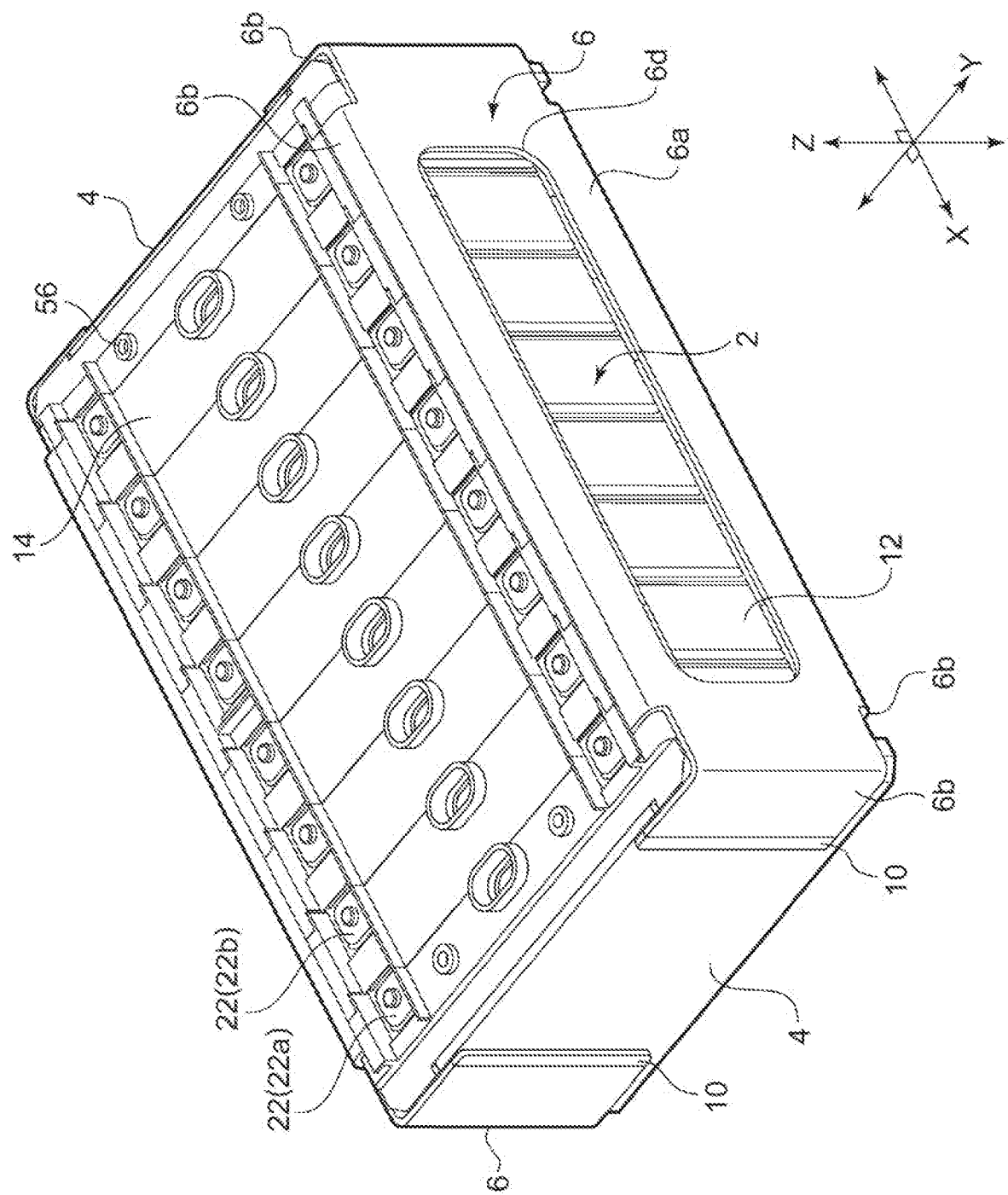
FIG. 2 is a perspective view of the battery module from which a cover is removed.

FIG. 1 is a schematic perspective view that illustrates a structure of a battery module according to a first exemplary embodiment. FIG. 2 is a perspective view of the battery module from which a cover is removed. FIGS. 1 and 2 schematically illustrate welded portions 10. Battery module 1 mainly includes battery stack 2, a pair of end plates 4, a pair of restraint members 6, cover 8, and welded portions 10. Battery stack 2 includes a plurality of batteries 12. For example, eight batteries 12 are connected in series with bus bars (not illustrated) to form battery stack 2 in the present exemplary embodiment.

For example, each battery 12 is a rechargeable secondary battery, such as a lithium-ion battery, a nickel-hydrogen battery, or a nickel-cadmium battery. Battery 12 is what is called prismatic battery. The plurality of batteries 12 are stacked at predetermined intervals. Main surfaces of adjacent batteries 12 face each other. The "stack" means an arrangement of a plurality of members arranged in any one direction. Therefore, the stack of batteries 12 includes an arrangement of the plurality of batteries 12 arranged in a horizontal direction.

In two adjacent batteries 12 that have been arrayed, positive-electrode output terminal 22 (positive-electrode terminal 22a) of one of batteries 12 is adjacent to negative-electrode output terminal 22 (negative-electrode terminal 22b) of the other battery 12. Hereinafter, if polarities of output terminals 22 do not need to be distinguished, positive-electrode terminals 22a and negative-electrode terminals 22b are collectively referred to as output terminals 22. Positive-electrode terminal 22a and negative-electrode terminal 22b that are adjacent to each other are electrically connected in series with a bus bar. The bus bar is a strip-shaped metal sheet, for example. One end of the bus bar is electrically connected to positive-electrode terminal 22a of one of batteries 12. The other end of the bus bar is electrically connected to negative-electrode terminal 22b of the other battery 12. In two adjacent batteries 12 that have been arrayed, positive-electrode terminal 22a of one of batteries 12 may be adjacent to positive-electrode terminal 22a of the other battery 12. For example, if two adjacent batteries 12 are connected in parallel, output terminals 22 of a same polarity are adjacent to each other in arrayed batteries 12.

Battery stack 2 also includes a plurality of separators 14. Separators 14 are also called insulating spacers. Separators 14 are made of a resin that has an insulation property, for example. Each separator 14 is disposed between two adjacent batteries 12 to electrically insulate two adjacent batteries 12. Separator 14 is also disposed between battery 12 and end plate 4 to insulate battery 12 and end plate 4. For example, separators 14 are made of a thermoplastic resin, such as polypropylene (PP) or polybutylene terephthalate (PBT). Separators 14 at outermost sides of battery stack 2 each include insertion holes 56. Fastening members 52 that fix cover 8 to battery stack 2 are inserted into insertion holes 56.

The pair of end plates 4 sandwich battery stack 2. The pair of end plates 4 are disposed at both ends, in stack direction X in which batteries 12 are stacked (a direction indicated by arrow X in FIGS. 1 and 2), of battery stack 2. Consequently, end plates 4 are adjacent to respective outermost batteries 12. Separator 14 between end plate 4 and battery 12 that are adjacent insulates end plate 4 and battery 12.

The pair of restraint members 6 are arrayed in direction Y perpendicular to stack direction X in which the plurality of batteries 12 and the pair of end plates 4 are stacked (direction Y is a direction indicated by arrow Y in FIGS. 1 and 2). An assembled set of battery stack 2 and the pair of end plates 4 is disposed between the pair of restraint members 6. Each restraint member 6 includes plane 6a that is rectangular and is parallel to a side of the assembled set, and eaves portions 6b that protrude from ends of sides of plane 6a toward the assembled set. Restraint member 6 is formed by folding each side of a rectangular metal sheet, for example. Two eaves portions 6b that are opposite to each other in stack direction X are in contact with respective end plates 4. Consequently, the pair of restraint members 6 sandwich battery stack 2 and the pair of end plates 4 in stack direction X.

Opening 6d is formed in plane 6a and exposes a side of the assembled set. It is preferable that the formation of opening 6d as slightly as possible affects rigidity of restraint member 6 against external force in stack direction X. Consequently, rigidity of restraint members 6 is maintained, and a weight of restraint members 6 is reduced. A plurality of openings may be formed in restraint members 6, as necessary.

Cover 8 is also called a top cover, and covers a surface of battery stack 2. The covered surface is a surface from which output terminals 22 project. A direction in which battery stack 2 and cover 8 are stacked is direction Z (a direction indicated by arrow Z in FIGS. 1 and 2). Cover 8 is a sheet-shaped member, and has a shape that corresponds to a shape of a top surface of battery stack 2. Cover 8 is rectangular in the present exemplary embodiment. Cover 8 prevents output terminals 22 of batteries 12, valves 24 that will be described later, the bus bars, and the like from being brought into contact with condensed water, dust, and the like. Cover 8 is made of a resin that has an insulation property, for example. For example, cover 8 is made of a thermoplastic resin, such as polypropylene (PP) or polybutylene terephthalate (PBT). Cover 8 includes insertion holes (not illustrated in the drawings) at positions that correspond to insertion holes 56 of separators 14.

Welded portions 10 are portions that fix end plates 4 to restraint members 6. In the present exemplary embodiment, welded portions 10 are at sections where end plates 4 are in contact with eaves portions 6b of restraint members 6.

Next, battery 12, separator 14, end plate 4, and a fixing structure that fixes end plate 4 to restraint members 6 will be described in detail.

Figure 3:
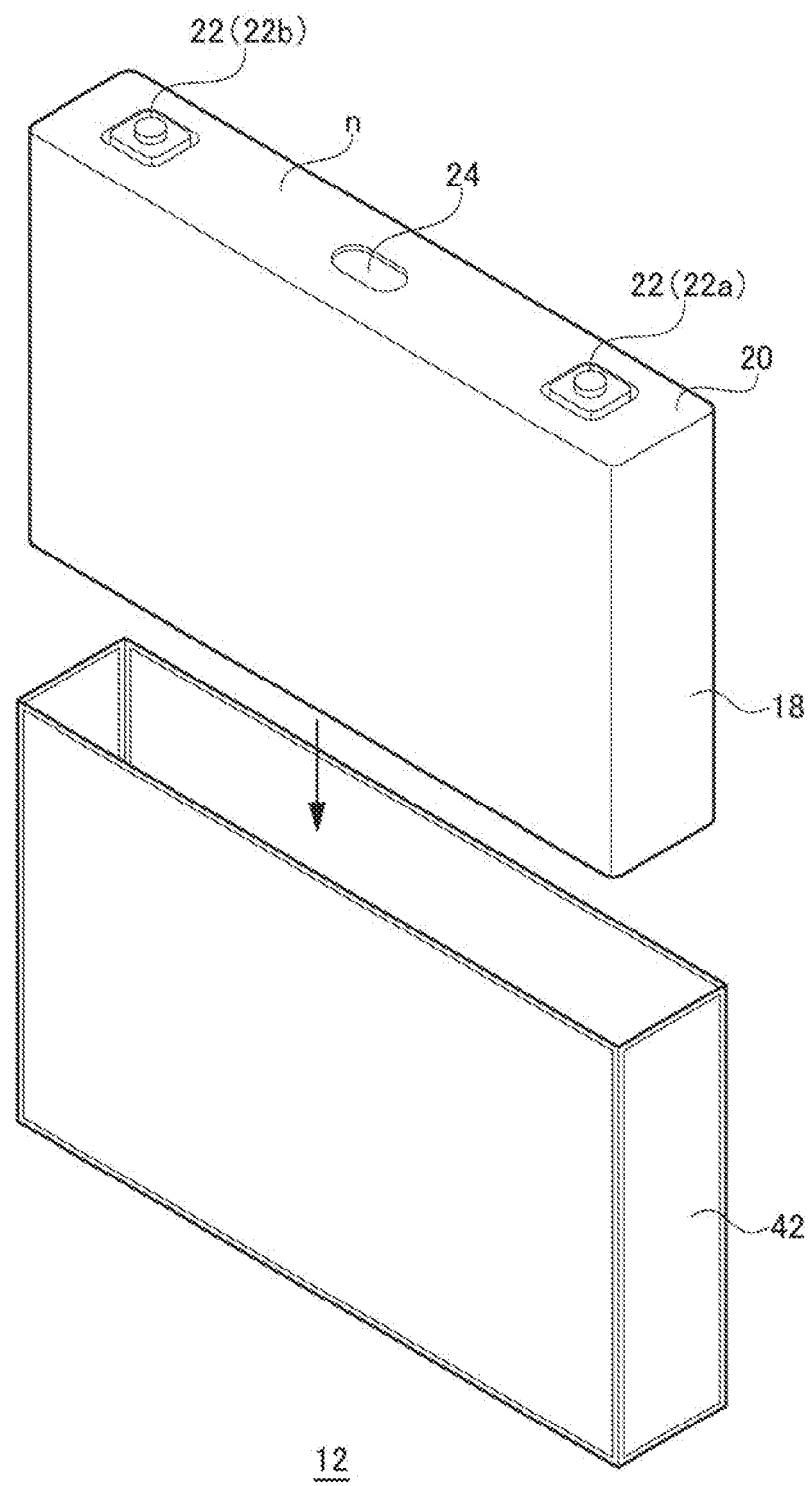
FIG. 3 is a schematic exploded perspective view that illustrates a structure of a battery.

FIG. 3 is a schematic exploded perspective view that illustrates a structure of battery 12. Battery 12 includes exterior can 18 that has a flat rectangular-parallelepiped shape. An opening that is substantially rectangular is formed in a surface of exterior can 18. An electrode assembly, electrolyte, and the like are put into exterior can 18 through the opening. Sealing plate 20 is attached to and seals the opening of exterior can 18. Sealing plate 20 includes positive-electrode terminal 22a near one of ends, in a longitudinal direction, of sealing plate 20, and includes negative-electrode terminal 22b near the other end, in the longitudinal direction, of sealing plate 20. Sealing plate 20 and output terminals 22 constitute a sealing body. Exterior can 18 and sealing plate 20 are made of metal. Typically, exterior can 18 and sealing plate 20 are made of aluminum or aluminum alloy, for example. Output terminals 22 are made of metal that has electrical conductivity.

In the present exemplary embodiment, a side on which the sealing body is attached is top surface n of battery 12, and a side opposite to the side on which the sealing body is attached is a bottom surface of battery 12. Battery 12 also includes two main surfaces that connect top surface n with the bottom surface. Areas of the main surfaces are the largest of areas of six surfaces of battery 12. Two surfaces of battery 12 that are not top surface n, the bottom surface, and the two main surfaces are side surfaces of battery 12. A top-surface side of batteries 12 is a top surface of battery stack 2. A bottom-surface side of batteries 12 is a bottom surface of battery stack 2.

Battery 12 includes valve 24 in a surface. Valve 24 releases gas generated within battery 12. In the present exemplary embodiment, battery 12 includes valve 24 in top surface n. Valve 24 is between a pair of output terminals 22 of sealing plate 20. Specifically, valve 24 is at substantially a center of sealing plate 20 in the longitudinal direction. Valve 24 is configured to open and release gas within exterior can 18 if pressure within exterior can 18 rises to a predetermined value or more. Valve 24 is also called a safety valve or a vent.

Battery 12 also includes insulating film 42. For example, insulating film 42 is a heat-shrink tube. After insulating film 42 accommodates exterior can 18, insulating film 42 is heated. Consequently, insulating film 42 shrinks, and thus coats a surface of exterior can 18. Insulating film 42 prevents short circuit between adjacent batteries 12.

Figure 4:
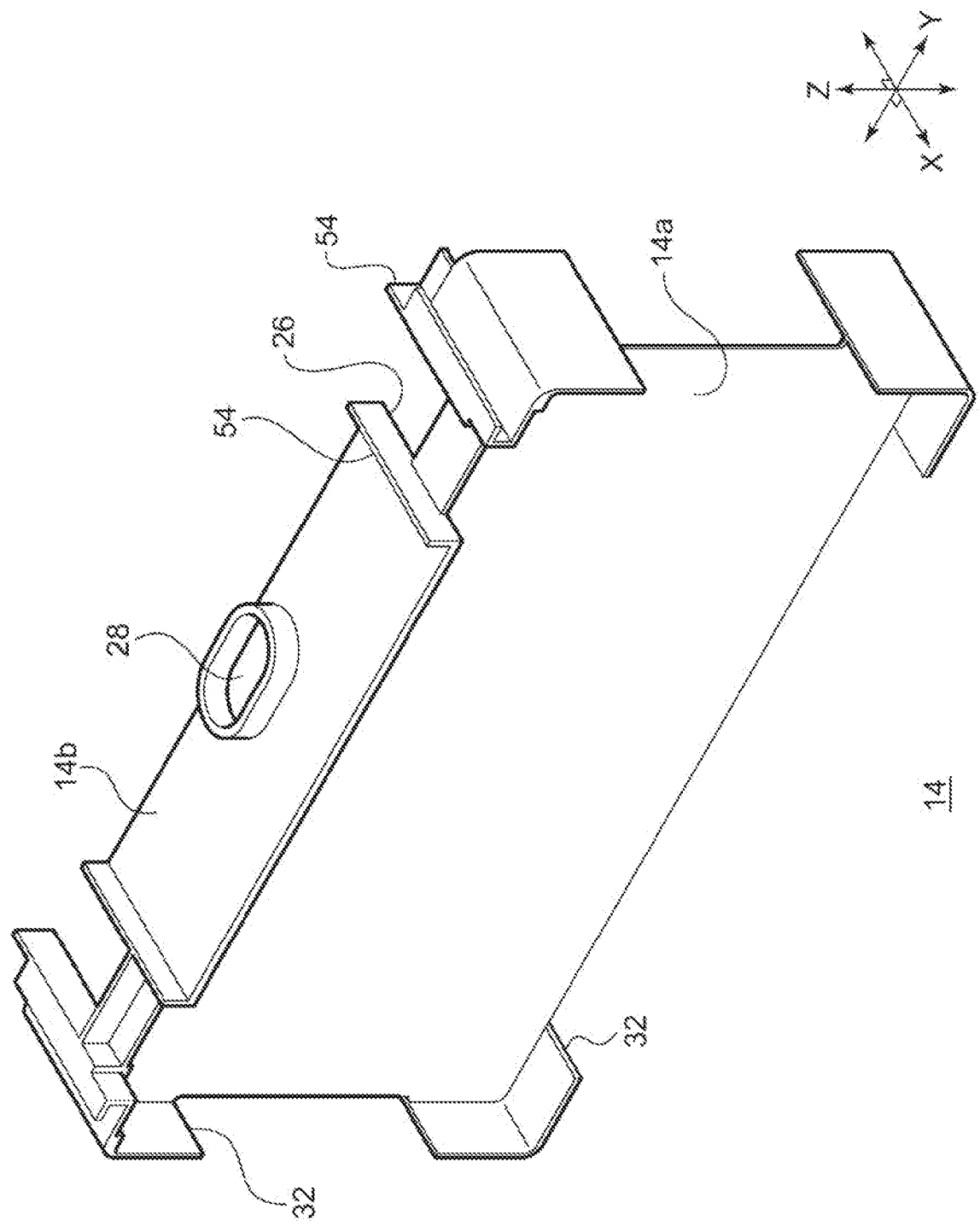
FIG. 4 is a schematic perspective view that illustrates a structure of a separator.

FIG. 4 is a schematic perspective view that illustrates a structure of separator 14. Separator 14 includes plane 14a parallel to the main surfaces of battery 12, and wall 14b that extends from an edge of plane 14a in stack direction X in which batteries 12 are stacked. Plane 14a extends between the main surfaces of adjacent batteries 12, and thus insulates adjacent batteries 12. Further, plane 14a extends between battery 12 and end plate 4, and thus insulates battery 12 and end plate 4.

Wall 14b covers top surface n, a bottom surface, and side surfaces of batteries 12. Consequently, wall 14b prevents short circuit between adjacent batteries 12 or between battery 12 and end plate 4 caused by condensation on a surface of battery 12 or end plate 4. In other words, wall 14b secures a creepage distance between adjacent batteries 12 or between battery 12 and end plate 4. Wall 14b that covers top surface n of battery 12 particularly prevents the short circuit described above. In the present exemplary embodiment, an edge of wall 14b of one of two adjacent separators 14 is in contact with an edge of wall 14b of the other separator 14. Therefore, battery 12 is accommodated in a space formed by planes 14a and walls 14b. In the present exemplary embodiment, separators 14 hold batteries 12 by means of walls 14b.

Wall 14b includes cutouts 26 at positions that correspond to output terminals 22. Cutouts 26 expose output terminals 22. Wall 14b also includes opening 28 at a position that corresponds to valve 24. Opening 28 exposes valve 24. Wall 14b includes cutouts 32 at positions that correspond to side surfaces and a bottom surface of battery 12. Cutouts 32 expose part of the side surfaces and part of the bottom surface of battery 12. In battery module 1 that has been assembled, walls 14b are between restraint members 6 and batteries 12. Consequently, restraint members 6 are not in contact with batteries 12.

Separator 14 includes supports 54 that project toward cover 8. Supports 54 support cover 8 after battery module 1 is assembled. Supports 54 are on wall 14b that covers top surface n of battery 12. In the present exemplary embodiment, supports 54 are at both ends, in direction Y, of each cutout 26. A pair of supports 54, and cutout 26 between the pair of supports 54 are aligned. The pair of supports 54 aligned in this way define a position where a bus bar is disposed. The bus bar is disposed between the pair of supports 54.

Figure 5:
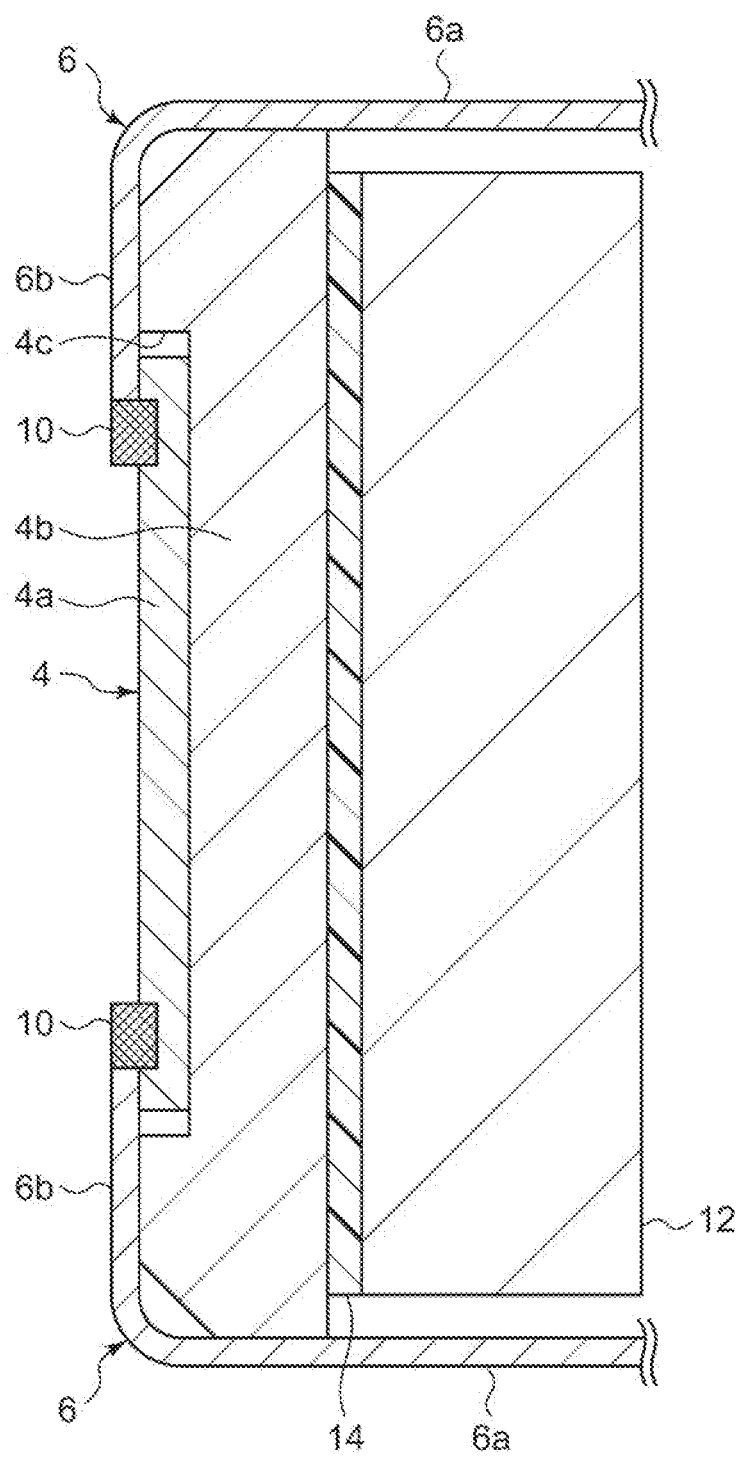
FIG. 5 is a cross-sectional view that schematically illustrates part of the battery module.
Figure 5:
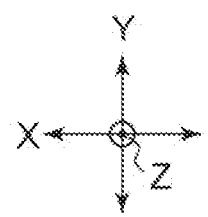

FIG. 5 is a cross-sectional view that schematically illustrates part of battery module 1. FIG. 5 illustrates a cross section parallel to XY-plane. FIG. 5 does not illustrate an internal structure of battery 12.

Each end plate 4 includes first portion 4a and second portion 4b. First portion 4a is at an outer side, in stack direction X, of battery module 1. Second portion 4b is at an inner side, in stack direction X, that is, at a battery-stack-2 side. Second portion 4b according to the present exemplary embodiment includes depression 4c on an outer side, in stack direction X, of second portion 4b. Depression 4c is at substantially a center, in direction Y, of end plate 4. At least part of first portion 4a is disposed in depression 4c. Preferably, all of first portion 4a is disposed in depression 4c. First portion 4a is fixed to second portion 4b with conventional publicly-known adhesive, for example. Alternatively, first portion 4a is fixed to second portion 4b by fitting first portion 4a into depression 4c. Separator 14 is in contact with an inner surface, in stack direction X, of second portion 4b. Eaves portion 6b of each restraint member 6 is in contact with an outer surface, in stack direction X, of first portion 4a. First portion 4a has a volume smaller than a volume of second portion 4b.

First portion 4a is made of a first metal. Second portion 4b is made of a second metal that is different from the first metal. Restraint members 6 are made of the first metal. The first metal has a Young's modulus higher than a Young's modulus of the second metal. The second metal has a density lower than a density of the first metal. For example, the first metal includes at least one type selected from the group consisting of iron (Fe) and stainless steel (SUS). The second metal includes at least one type selected from the group consisting of aluminum (Al), magnesium (Mg), and an aluminum alloy and a magnesium alloy.

Each welded portion 10 connects first portion 4a of end plate 4 with eaves portion 6b of each restraint member 6. Welded portion 10 is formed using a conventional publicly-known welding method. For example, first portion 4a of end plate 4 and eaves portion 6b of restraint member 6 are overlapped. The overlapped portion is irradiated with laser to perform penetration welding. Consequently, welded portion 10 is formed. Specifically, a surface of eaves portion 6b that faces backward first portion 4a is irradiated with laser. The laser penetrates the surface and eaves portion 6b, and reaches first portion 4a. Consequently, part of eaves portion 6b and part of first portion 4a melt. Consequently, welded portion 10 is formed that penetrates an interface between eaves portion 6b and first portion 4a. Welded portion 10 may be formed at an interface between first portion 4a and eaves portion 6b by fillet welding by irradiation with laser, brazing, or electric resistance welding.

For example, battery module 1 is assembled as follows: First, the plurality of batteries 12 and the plurality of separators 14 are alternately stacked to form battery stack 2. Next, battery stack 2 is sandwiched with the pair of end plates 4 to form an assembled set. Then the pair of restraint members 6 are attached to this assembled set. Part of the assembled set enters a space surrounded by four eaves portions 6b of each restraint member 6. In this condition, portion of each eaves portion 6b of restraint member 6 that overlaps first portion 4a of end plate 4 is welded to form welded portions 10. Consequently, the pair of end plates 4 and the pair of restraint members 6 fasten the plurality of batteries 12 and the plurality of separators 14 together.

Restraint members 6 fasten and position the plurality of batteries 12 in stack direction X. Further, bottom surfaces of the plurality of batteries 12 are in contact with respective separators 14, and separators 14 are in contact with lower eaves portions 6b of restraint members 6. Top surfaces of the plurality of batteries 12 are in contact with respective separators 14, and separators 14 are in contact with upper eaves portions 6b of restraint members 6. Side surfaces of the plurality of batteries 12 are in contact with respective separators 14, and separators 14 are in contact with planes 6a of restraint members 6. Consequently, the plurality of batteries 12 are positioned in direction Y and direction Z. In that condition, the bus bars are electrically connected to output terminals 22 of batteries 12. Then cover 8 is attached to a top surface of battery stack 2. Battery module 1 is obtained through the steps described above.

As described above, battery module 1 according to the present exemplary embodiment includes battery stack 2, the pair of end plates 4 at both ends of battery stack 2, the pair of restraint members 6 that sandwich battery stack 2 and the pair of end plates 4 in stack direction X in which batteries 12 are stacked, and welded portions 10 that connect end plates 4 with restraint members 6. Each end plate 4 includes first portion 4*a* made of the first metal and second portion 4*b* made of the second metal. The first metal has a Young's modulus higher than a Young's modulus of the second metal. For example, the first metal includes at least one type selected from the group consisting of Fe and SUS. The second metal has a density lower than a density of the first metal. The second metal includes at least one type selected from the group consisting of Al, Mg, an Al alloy, and a Mg alloy. Restraint members 6 are made of the first metal. Welded portions 10 connect first portions 4*a* of end plates 4 with restraint members 6.

Since restraint members 6 are made of the first metal that has a high Young's modulus, such as Fe or SUS, restraint members 6 have high rigidity against external force in stack direction X. Consequently, a shape of battery module 1 is surely maintained even if swollen batteries 12 apply stress to restraint members 6, for example. Further, first portions 4*a* are made of the first metal that is the same as that of restraint members 6, or similar to that of restraint members 6. Therefore, welded portions 10 that connect first portions 4*a* with restraint members 6 are formed. Since end plates 4 are fixed to restraint members 6 with welded portions 10 instead of fastening members, such as screws, the number of components of battery module 1 decreases, and battery module 1 can be reduced in size.

On the other hand, second portions 4*b* are made of a metal that has a low density, such as Al or Mg. That is, the second metal is lighter than the first metal. Since part of end plates 4 is made of the second metal, increase in weight of end plates 4 is restricted, a thickness of end plates 4 is secured, and rigidity of end plates 4 is increased. The increased rigidity of end plates 4 restricts dimensional variation in battery module 1 caused by swollen batteries 12. That is, rigidity of battery module 1 increases.

If whole end plates 4 are made of the first metal and a thickness of end plates 4 is increased to increase rigidity of battery module 1, a weight of battery module 1 significantly increases. If rigidity of battery module 1 is increased while a weight of battery module 1 is kept, each end plate 4 may be a sheet of the first metal bent into a bellows-like shape. In that case, however, end plates 4 are significantly increased in size, and thus battery module 1 is increased in size. If end plates 4 each include first portion 4*a* made of the first metal and second portion 4*b* made of the second metal, rigidity of battery module 1 can be increased while increase in size and weight of battery module 1 can be prevented, within the limitation on a combination of materials of end plates 4 and restraint members 6 due to welded structure.

The increased rigidity of battery module 1 reduces dimensional variation in battery module 1. Therefore, a margin for swelling of battery module 1 can be reduced for a space where battery module 1 is disposed. Consequently, the space where battery module 1 is disposed is reduced. Consequently, an energy density relative to the space where battery module 1 is disposed is increased. The end plates according to the present exemplary embodiment have dimensional accuracy higher than dimensional accuracy of end plates that have a complicated shape, such as a bellows-like shape. Therefore, dimensional accuracy of battery module 1 increases.

In the present exemplary embodiment, second portions 4*b* include depressions 4*c*, and at least part of first portions 4*a* is disposed in depressions 4*c*. Consequently, increase in size of end plates 4 is restricted. Further, first portions 4*a* are easily positioned relative to second portions 4*b*.

When end plates 4 are welded to restraint members 6, heat may transfer to separators 14 and batteries 12. Preferably, such heat transfer is avoided as much as possible to maintain performance of batteries 12 and insulation of separators 14. In this regard, end plates 4 each include first portion 4*a* mainly for welding, and second portion 4*b* mainly for increase in rigidity. Thermal contact resistance at an interface between first portion 4*a* and second portion 4*b* reduces heat transfer from first portion 4*a* to second portion 4*b*. Consequently, transfer of welding heat to separators 14 and batteries 12 is restricted. Further, heat becomes likely to stay at first portion 4*a*, and thus an amount of input heat during welding is reduced. Since first portion 4*a* has a volume smaller than a volume of second portion 4*b*, necessary input heat is reduced. Further, since increase in thickness of end plates 4 is less needed to restrict transfer of welding heat, a thickness of end plates 4 can be reduced, and thus a size of battery module 1 can be reduced.

Second Exemplary Embodiment

Figure 6:
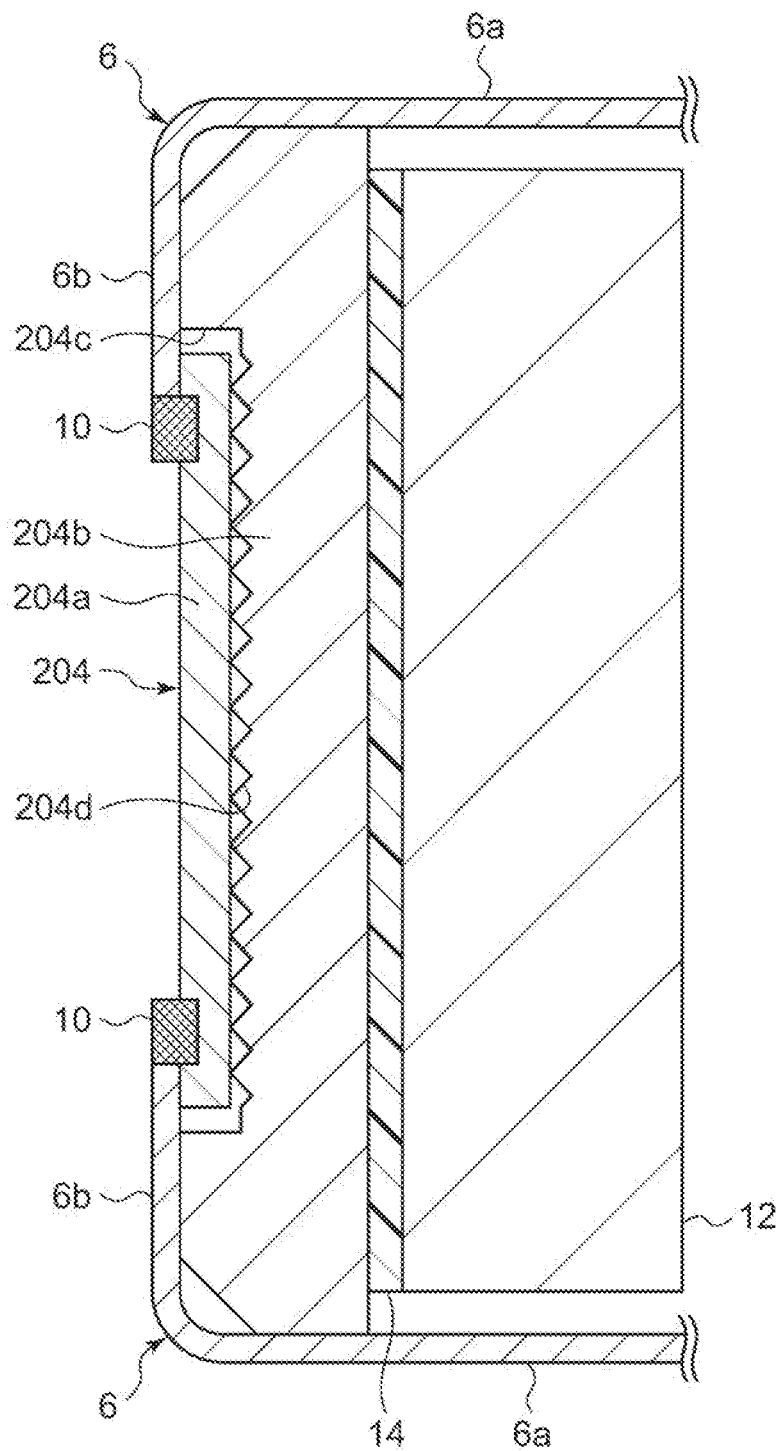
FIG. 6 is a cross-sectional view that schematically illustrates part of a battery module according to a second exemplary embodiment.
Figure 6:
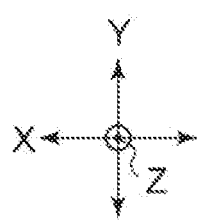

A battery module according to a second exemplary embodiment and the battery module according to the first exemplary embodiment share a common configuration except for a different configuration of end plates. Hereinafter, a configuration of the battery module according to the present exemplary embodiment that is different from a configuration of the first exemplary embodiment will be mainly described. A common configuration will be simply described, or will not be described. FIG. 6 is a cross-sectional view that schematically illustrates part of the battery module according to the second exemplary embodiment. FIG. 6 illustrates a cross section parallel to XY-plane. FIG. 6 does not illustrate an internal structure of battery 12.

Battery module 201 according to the present exemplary embodiment includes a pair of end plates 204. Each end plate 204 includes first portion 204*a* and second portion 204*b*. First portion 204*a* is at an outer side in stack direction X. Second portion 204*b* is at an inner side in stack direction X. Second portion 204*b* includes depression 204*c* on an outer side, in stack direction X, of second portion 204*b*. First portion 204*a* is disposed in depression 204*c*. Separator 14 is in contact with an inner surface, in stack direction X, of second portion 204*b*. Eaves portion 6*b* of each restraint member 6 is in contact with an outer surface, in stack direction X, of first portion 204*a*. First portion 204*a* is made of the first metal. Second portion 204*b* is made of the second metal. The first metal and the second metal have been described in the first exemplary embodiment.

Each end plate 204 includes heat-transfer restrictor 204*d* that restricts heat transfer between first portion 204*a* and second portion 204*b*. Unevenness on a bottom surface of depression 204*c* constitutes heat-transfer restrictor 204*d* according to the present exemplary embodiment. The unevenness is formed on the bottom surface of depression 204*c* using a conventional publicly-known process that forms a rough surface. Heat-transfer restrictor 204*d* may be constituted by unevenness on a surface of first portion 204*a* that faces a second-portion-204*b* side. Further, heat-transfer restrictor 204*d* may be configured by a conventional publicly-known heat-insulating sheet, for example.

Since end plates 204 include heat-transfer restrictors 204d, less heat is transferred to separators 14 and batteries 12 during formation of welded portions 10. Further, input heat during welding is further reduced.

Third Exemplary Embodiment

Figure 7:
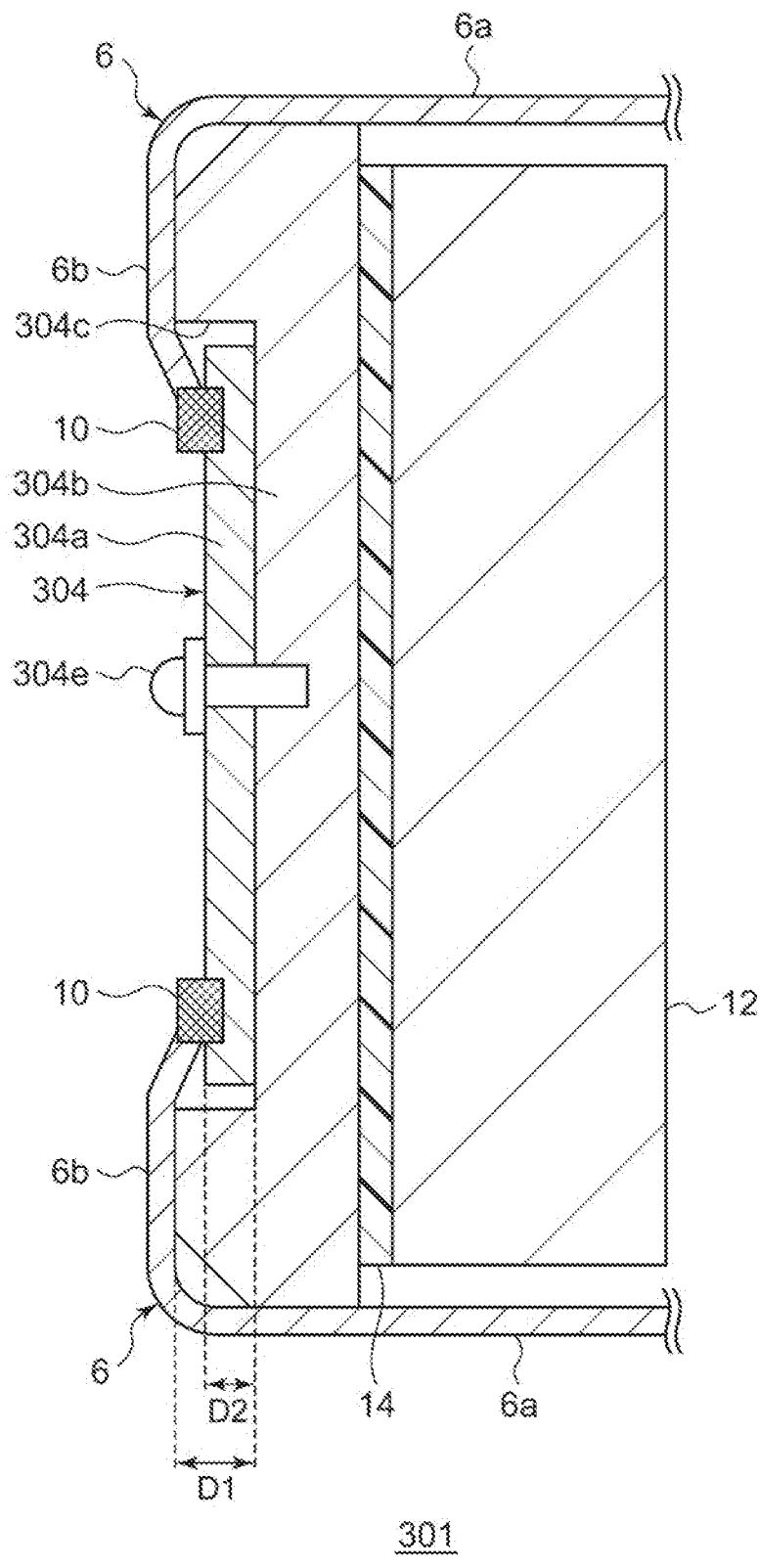
FIG. 7 is a cross-sectional view that schematically illustrates part of a battery module according to a third exemplary embodiment.
Figure 7:
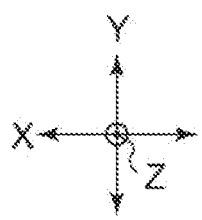

A battery module according to a third exemplary embodiment and the battery module according to the first exemplary embodiment share a common configuration except for a different configuration of end plates. Hereinafter, a configuration of the battery module according to the present exemplary embodiment that is different from a configuration of the first exemplary embodiment will be mainly described. A common configuration will be simply described, or will not be described. FIG. 7 is a cross-sectional view that schematically illustrates part of the battery module according to the third exemplary embodiment. FIG. 7 illustrates a cross section parallel to XY-plane. FIG. 7 does not illustrate an internal structure of battery 12.

Battery module 301 according to the present exemplary embodiment includes a pair of end plates 304. Each end plate 304 includes first portion 304a and second portion 304b. First portion 304a is at an outer side in stack direction X. Second portion 304b is at an inner side in stack direction X. Second portion 304b includes depression 304c on an outer side, in stack direction X, of second portion 304b. First portion 304a is disposed in depression 304c. Separator 14 is in contact with an inner surface, in stack direction X, of second portion 304b. Eaves portion 6b of each restraint member 6 is in contact with an outer surface, in stack direction X, of first portion 304a. First portion 304a is made of the first metal. Second portion 304b is made of the second metal. The first metal and the second metal have been described in the first exemplary embodiment.

Depth D1 of depression 304c, which is a distance from an outer surface, in stack direction X, of second portion 304b to a bottom surface of depression 304c is larger than thickness D2, in stack direction X, of first portion 304a. Consequently, whole first portion 304a is more surely disposed in depression 304c in stack direction X. Further, interfaces between first portion 304a and eaves portions 6b are also disposed in depression 304c in stack direction X. Therefore, welded portions 10 are formed in depression 304c. Consequently, welded portions 10 do not project outward, in stack direction X, and thus increase in size of battery module 301 can be restricted.

Each end plate 304 also includes fixing member 304e that fixes first portion 304a to second portion 304b. Fixing member 304e is a screw, for example. Insertion holes are formed at a predetermined position of each of first portion 304a and second portion 304b, e.g. substantially a center, in direction Y and direction Z, of first portion 304a and second portion 304b. Fixing member 304e is inserted into the insertion holes to fix first portion 304a to second portion 304b. Consequently, rigidity of end plates 304 is increased. Since a surface of first portion 304a is disposed in depression 304c, projection of fixing member 304e from first portion 304a in stack direction X is absorbed. Consequently, increase in size of battery module 1 due to fixing member 304e is restricted. Depth D1 of depression 304c that is larger than thickness D2 of first portion 304a and fixing member 304e are not necessarily combined but may be separately used.

The present invention is not limited to the exemplary embodiments described above. The exemplary embodiments may be combined. Alternatively, the exemplary embodiments may be modified, such as various design changes based on knowledge of a person skilled in the art. The combined or modified exemplary embodiments also fall within the scope of the present invention. New exemplary embodiments obtained by combining the exemplary embodiments described above have effects of the combined exemplary embodiments. Alternatively, new exemplary embodiments obtained by modifying the exemplary embodiments described above have effects of the modified exemplary embodiments.

Battery 12 does not necessarily include insulating film 42. A shape of battery 12 is not particularly limited. For example, battery 12 may be cylindrical. The number of batteries 12 included in a battery stack is not particularly limited. Only one of end plates 4 may include first portion 4a and second portion 4b. The number of restraint members 6 may be one or three or more.

Any combination of the components described above are also effective as aspects of the present invention. Further, conversions of an expression of the present invention between methods, devices, systems, and the like are also effective as aspects of the present invention.

REFERENCE MARKS IN THE DRAWINGS 1, 201, 301: battery module
2: battery stack
4, 204, 304: end plate
4a, 204a, 304a: first portion
4b, 204b, 304b: second portion
4c, 204c, 304c: depression
6: restraint member
10: welded portion
12: battery
204d: heat-transfer restrictor
304e: fixing member

The invention claimed is:
1. A battery module comprising:
a battery stack that includes a plurality of batteries stacked;
a pair of end plates that are disposed at both ends, in a stack direction in which the batteries are stacked, of the battery stack, the pair of end plates including at least one end plate that includes a first portion made of a first metal that has a Young's modulus higher than a Young's modulus of a second metal, and a second portion made of the second metal that has a density lower than a density of the first metal;
a pair of restraint members disposed on both sides of the battery stack, the pair of restraint members being made of the first metal, wherein the pair of restraint members have eaves portions that protrude from ends of sides of restraint members and are bent inwardly so that the eaves portions sandwich the battery stack and the pair of end plates in the stack direction, wherein
the first portion includes a first face and a second face,
the second portion includes a third face and a fourth face,
the first face faces the battery stack in the stacking direction,
the second face is opposed to the first face in the stacking direction,
the third face faces the battery stack in the stacking direction, and
the fourth face is opposed to the third face in the stacking direction; and welded portions that connect the second face of the first portion of the at least one end plate with the eaves portions of the pair of the restraint members, wherein:

at least part of the second portion is disposed between the first portion and the battery stack, the second portion includes a depression at an area including a center of the fourth face, at least part of the first portion is disposed in the depression, and the first face of the first portion is in contact with the bottom surface of the depression.

2. The battery module according to claim 1, wherein
the first metal includes at least one type selected from the group consisting of iron and stainless steel, and
the second metal includes at least one type selected from the group consisting of aluminum, magnesium, an aluminum alloy, and a magnesium alloy.

3. The battery module according to claim 1, wherein the at least one end plate includes a heat-transfer restrictor that restricts heat transfer between the first portion and the second portion.

4. The battery module according to claim 1, wherein a depth of the depression is larger than a thickness of the first portion in the stack direction.

5. The battery module according to claim 1, further comprising a fixing member that fixes the first portion to the second portion.

6. The battery module according to claim 1, wherein the eaves portions of the pair of restraint members are in contact with the front face of the first portion and the sides of restraint members are in contact with the second portion.

7. The battery module according to claim 6, wherein the first portion is exposed from the pair of restraint members.

8. The battery module according to claim 3, wherein:
the heat-transfer restrictor comprises unevenness formed at the bottom surface of the depression, and
the first face is in contact with a convex part of the unevenness and is not contact with a concave part of the unevenness.

9. A battery module comprising:
a battery stack that includes a plurality of batteries stacked;
a pair of end plates that are disposed at both ends, in a stack direction in which the batteries are stacked, of the battery stack, the pair of end plates including at least one end plate that includes a first portion made of a first metal that has a Young's modulus higher than a Young's modulus of a second metal, and a second portion made of the second metal that has a density lower than a density of the first metal;
a pair of restraint members disposed on both sides of the battery stack, the pair of restraint members being made of the first metal, wherein the pair of restraint members have eaves portions that protrude from ends of sides of restraint members and are bent inwardly so that the eaves portions sandwich the battery stack and the pair of end plates in the stack direction, wherein
the first portion includes a first face and a second face,
the second portion includes a third face and a fourth face,
the first face faces the battery stack in the stacking direction,
the second face is opposed to the first face in the stacking direction,
the third face faces the battery stack in the stacking direction, and
the fourth face is opposed to the third face in the stacking direction; and
welded portions that connect the second face of the first portion of the at least one end plate with the eaves portions of the pair of the restraint members, wherein:
at least a part of the second portion is disposed between the first portion and the battery stack,
the second portion includes a depression at an area including a center of the fourth face,
an entirely of the first portion is disposed in the depression, and
the first face of the first portion is in contact with the bottom surface of the depression.

10. The battery module according to claim 9, wherein
the first metal includes at least one type selected from the group consisting of iron and stainless steel, and
the second metal includes at least one type selected from the group consisting of aluminum, magnesium, an aluminum alloy, and a magnesium alloy.

11. The battery module according to claim 9, wherein the at least one end plate includes a heat-transfer restrictor that restricts heat transfer between the first portion and the second portion.

12. The battery module according to claim 9, wherein a depth of the depression is larger than a thickness of the first portion in the stack direction.

13. The battery module according to claim 9, further comprising a fixing member that fixes the first portion to the second portion.

14. The battery module according to claim 9, wherein the eaves portions of the pair of restraint members are in contact with the front face of the first portion and the sides of restraint members are in contact with the second portion.

15. The battery module according to claim 14, wherein the first portion is exposed from the pair of restraint members.

16. The battery module according to claim 11, wherein:
the heat-transfer restrictor comprises unevenness formed at the bottom surface of the depression, and
the first face is in contact with a convex part of the unevenness and is not contact with a concave part of the unevenness.

17. The battery module according to claim 9, wherein the eaves portions of the pair of restraint members are in contact with the front face of the second portion.

18. The battery module according to claim 4, wherein a tip of the eaves portions bent inward toward the second face, and an entirety of the welded portions are formed in the depression.

19. The battery module according to claim 12, wherein a tip of the eaves portions bent inward toward the second face, and an entirety of the welded portions are formed in the depression.

* * * * *